United States Patent [19]

Johnson et al.

[11] Patent Number: 5,667,140

[45] Date of Patent: Sep. 16, 1997

[54] ENGINE EXHAUST NOZZLE SEAL

[75] Inventors: Steven B. Johnson; Curtis W. Berger, both of Stuart; Miguel A. Garrido, West Palm Beach; William G. Hoop, Palm Beach Gardens, all of Fla.

[73] Assignee: United Technologies Corporation, Hartford, Conn.

[21] Appl. No.: 349,116

[22] Filed: Dec. 2, 1994

[51] Int. Cl.⁶ .................................................. B64C 15/02
[52] U.S. Cl. ........................... 239/265.33; 239/265.41; 239/265.39
[58] Field of Search .................. 239/265.33, 265.35, 239/265.37, 265.39, 265.41, 265.19

[56] References Cited

U.S. PATENT DOCUMENTS

| | | | |
|---|---|---|---|
| 2,910,828 | 11/1959 | Meyer et al. | 60/35.6 |
| 3,786,992 | 1/1974 | Robinson | 239/265.39 |
| 4,176,792 | 12/1979 | McCardle, Jr. | 239/265.41 |
| 4,637,550 | 1/1987 | Nash | 239/265.37 |
| 4,662,566 | 5/1987 | Honeycutt, Jr. | 239/265.39 |
| 4,690,330 | 9/1987 | Robinson et al. | 239/265.39 |
| 4,994,660 | 2/1991 | Hauer | 239/265.41 |
| 5,039,014 | 8/1991 | Lippmeier | 239/265.39 |
| 5,076,496 | 12/1991 | Lippmeier | 239/265.41 |
| 5,082,182 | 1/1992 | Bruchez, Jr. et al. | 239/265.35 |
| 5,110,050 | 5/1992 | Nightingale | 239/265.39 |
| 5,215,256 | 6/1993 | Barcza | 239/265.39 |
| 5,215,257 | 6/1993 | Barcza | 239/265.39 |
| 5,238,189 | 8/1993 | Barcza | 239/265.39 |
| 5,285,637 | 2/1994 | Barcza | 60/230 |

FOREIGN PATENT DOCUMENTS 2230299  10/1990  United Kingdom .

*Primary Examiner*—Matthew C. Graham
*Attorney, Agent, or Firm*—Richard D. Getz

[57] ABSTRACT

A seal for a gas turbine engine exhaust nozzle is provided, comprising a body, a spine member attached to one side of the body, and a plurality of face segments attached to the side of the body opposite that to which the spine member is attached. The body includes a length and a width, a plurality of corrugations formed in the body extending across the width, and a first and a second channel. One of the channels is positioned on one side of the body width and the other channel is positioned on the other side of the body width. Each face segment includes a first end and a second end. The ends of the face segments are freely received within the first and second channels such that the ends may translate within the channels.

8 Claims, 4 Drawing Sheets

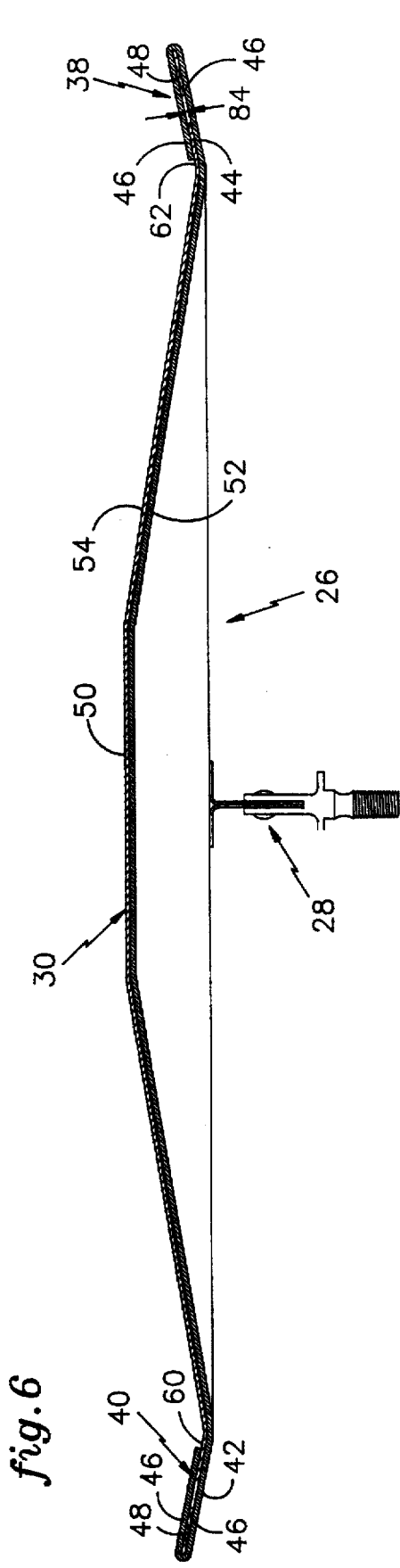
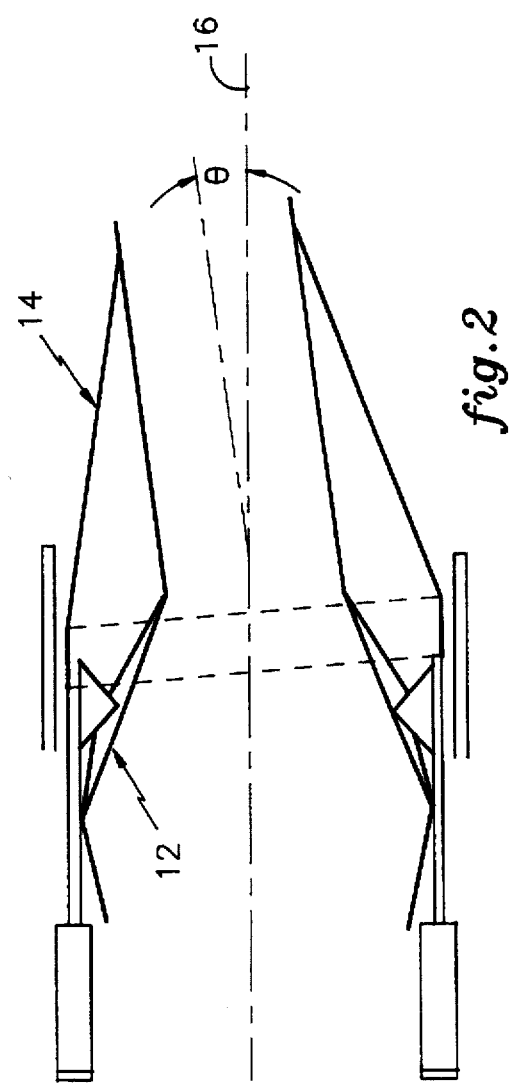

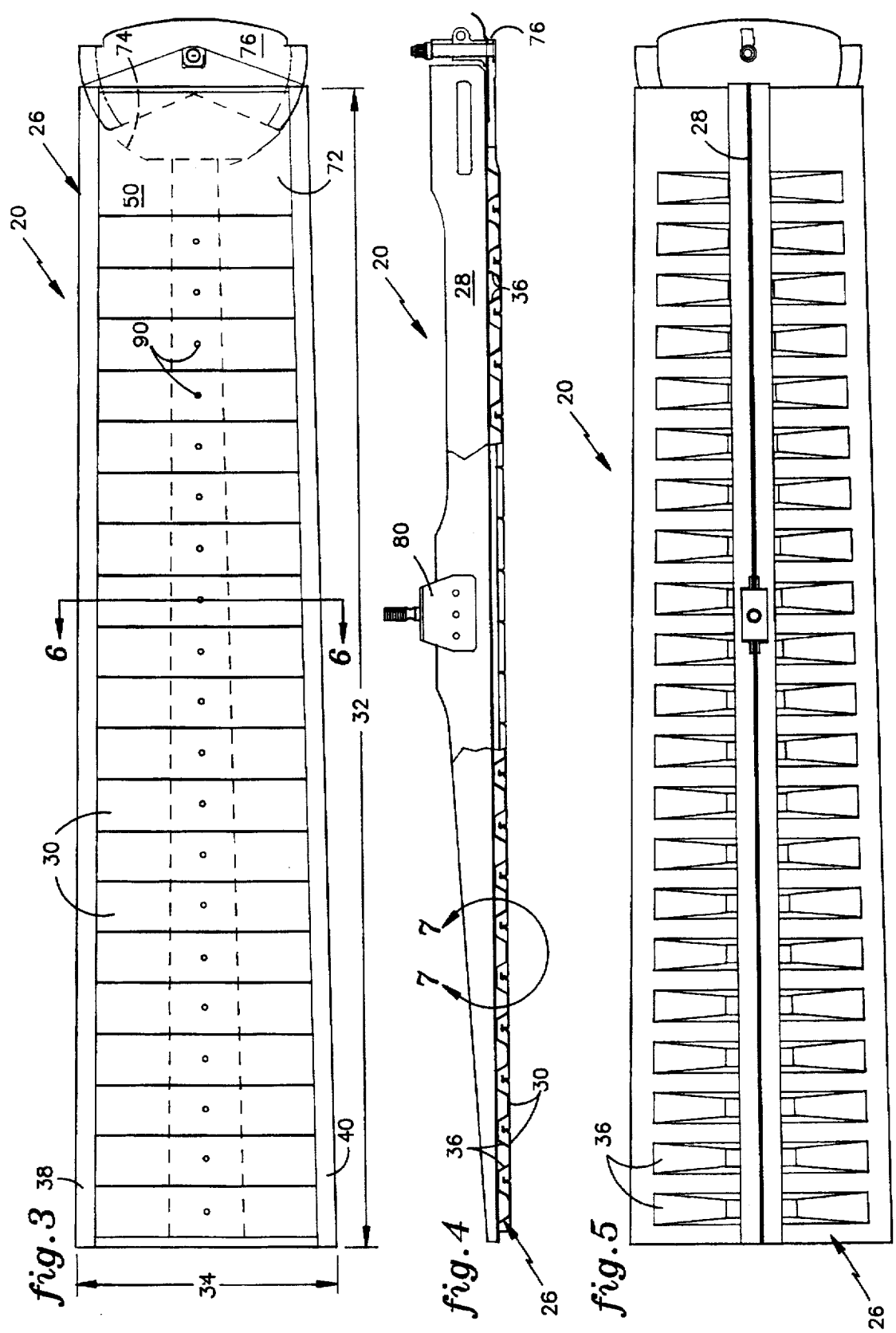

ENGINE EXHAUST NOZZLE SEAL

BACKGROUND OF THE INVENTION

1. Technical Field

This invention pertains to engine nozzles in general, and to seals for sealing between flaps within the engine nozzle in particular.

2. Background Information

In certain gas turbine driven aircraft, it is advantageous to equip the engine with a convergent-divergent (c/d) exhaust nozzle. The term "convergent-divergent" describes an exhaust nozzle having a convergent section upstream of a divergent section. Exhaust gases exiting the turbine phase of the engine pass through the decreasing diameter convergent section before passing through the increasing diameter divergent section.

In engines having conventional c/d nozzles, both the convergent and divergent sections are symmetric about the longitudinal axis of the engine. The divergent section includes a plurality of flaps, hinged at the interface between the convergent and divergent sections, which can be pivoted radially outward to increase the angle at which the divergent section diverges from the longitudinal axis. Flap seals are positioned between the flaps of the divergent section to prevent exhaust gas from escaping between the flaps.

In gas turbine engines featuring vectorable c/d exhaust nozzles, the centerline of the divergent section may be skewed from the longitudinal centerline to create pitch and yaw thrust vectoring. Skewing the divergent flaps causes the position of the flaps relative to one another to vary depending upon the direction and magnitude of the skew and the position of the particular flap relative to the skew. In some areas, the spacing between flaps decreases. In other areas, the spacing between flaps increases and assumes a more complicated geometry. In addition, skewing the flaps and flap seals into the flow path of the exhaust gas causes the mechanical and thermal load on the flaps and flap seals to increase.

Hence, what is needed is an exhaust nozzle flap seal that can accommodate complex geometries and can accommodate increased mechanical and thermal loads.

DISCLOSURE OF THE INVENTION

It is, therefore, an object of the present invention to provide an exhaust nozzle flap seal capable of withstanding the mechanical load associated with a vectorable exhaust nozzle.

It is another object of the present invention to provide an exhaust nozzle flap seal capable of withstanding the thermal load associated with a vectorable exhaust nozzle.

It is another object of the present invention to provide an exhaust nozzle flap seal that minimally distorts in response to a thermal load.

It is another object of the present invention to provide an exhaust nozzle flap seal that improves sealing between flaps in a vectorable exhaust nozzle.

According to the present invention, a seal for a gas turbine engine exhaust nozzle is provided, comprising a body, a spine member attached to one side of the body, and a plurality of face segments attached to the side of the body opposite that to which the spine member is attached. The body includes a length and a width, a plurality of corrugations formed in the body extending across the width, and a first and a second channel. The channels are positioned on opposite sides of the width of the body. Each face segment includes a first end and a second end. The ends of the face segments are freely received within the first and second channels such that the ends may translate within the channels.

According to one aspect of the present invention, means is provided for accommodating disparate thermal growth within a flap seal.

An advantage of the present invention is that a flap seal for an exhaust nozzle is provided which allows thermal expansion without deformation. Each of the plurality of face segments can expand and shift as is necessary to accommodate a large thermal load without damaging the seal.

Another advantage of the present invention is that the combination of the body, spine member, and face segments provides a rigid structure along the length of the flap seal, and yet still allows the seal to be torsionally twisted for nozzle vectoring geometries. Structural rigidity along the length of the seal is important to prevent the seal from buckling under the larger loads associated with vectorable nozzles. The seal's torsional flexibility is important because it allows the seal to properly seal between the flaps in any of the possible flap positions associated with vectoring nozzles.

A further advantage of the present invention is the weight of the seal. The structural design of the seal provides the necessary structural integrity, thereby allowing the use of lightweight materials. A person of skill in the art will recognize that it is a significant advantage to provide a lightweight nozzle component.

A still further advantage of the present invention is that a means is provided for accommodating disparate thermal growth within a flap seal. Accommodating disparate thermal growth within a structure decreases the stresses within the structure and therefore the likelihood of damage.

These and other objects, features and advantages of the present invention will become apparent in light of the detailed description of the best mode embodiment thereof, as illustrated in the accompanying drawings.

BRIEF DESCRIPTION OF THE DRAWINGS

FIG. 2 is a diagrammatic illustration showing an exhaust nozzle.

FIG. 3 is a hot-side view of a flap seal.

FIG. 4 is a side view of the flap seal shown in FIG. 3, partially cut-away.

FIG. 5 is a cold-side view of the flap seal shown in FIG. 3.

FIG. 6 is a sectional view of the flap seal shown in FIG. 3.

BEST MODE FOR CARRYING OUT THE INVENTION

Figure 1:
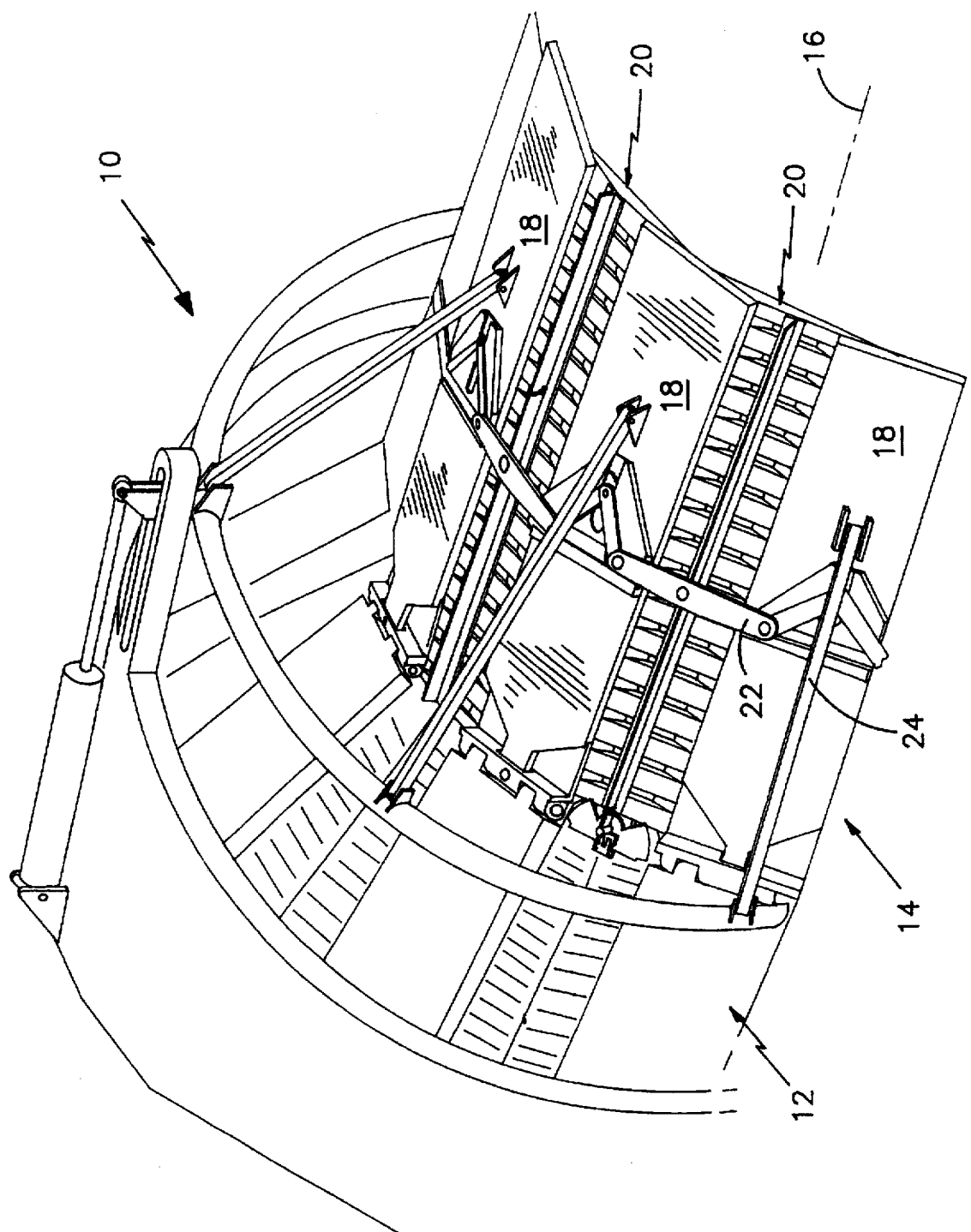
FIG. 1 shows a partial perspective view of an exhaust nozzle for a gas turbine engine.

Referring to FIG. 1, a gas turbine engine includes an exhaust nozzle 10 comprising a convergent section 12 upstream of a divergent section 14. Both the convergent 12 and the divergent 14 sections are symmetrically arranged about the longitudinal axis 16 of the engine, although the divergent section 14 may skewed from the axis 16. FIG. 2 shows a diagrammatic representation of a divergent section skewed an angle θ from the longitudinal axis 16 of the engine.

The divergent section 14 includes a plurality of flaps 18 and flap seals 20 pivotly attached to the convergent section 12 on one end. Mechanical linkage 22 links the flaps 18 and the flap seals 20 together, such that actuating the flaps causes the seals to actuate in like manner. A second mechanical linkage 24, attached to each of the flaps 18, actuates the flaps 18 and flap seals 20 about the longitudinal axis 16, or about an axis skewed relative to the longitudinal axis 16, or both. U.S. Pat. No. 5,238,189, hereby incorporated by reference, discloses an example of the aforementioned linkages 22,24. Referring to FIGS. 3–5, each flap seal 20 includes a body 26, a spine member 28, and a plurality of face segments 30. FIG. 3 shows a "hot-side" view of a flap seal 20. The hot-side of the flap seal 20 is defined as that side which is directly exposed to exhaust gases exiting the engine. The cold-side of the flap seal 20 is defined as the side of the flap seal 20 opposite that which is directly exposed to exhaust gases. The body 26 may be described as having a length 32 and a width 34, as is shown in FIGS. 3 and 5. The body 26 further includes a plurality of corrugations 36 formed in the body 26, extending across the body width 34, and a first 38 and a second 40 channel (see FIG. 6 also). In the preferred embodiment, the corrugations 36 are formed in the body 26 by a press (not shown). A person of skill in the art will recognize that other forming processes and corrugation geometries other than that shown in FIGS. 4 and 7 may be used alternatively.

Referring to FIG. 6, the first 38 and second 40 channel are formed along the width edges 42,44 of the body 26 by folding the edges of the body 26 sheet metal back over into a "U" shape. The walls 46 of the "U" extend lengthwise along the body 26. In one embodiment, a spacer 48 having a predetermined thickness is inserted into each channel 38,40 and spot welded into place.

Figure 7:
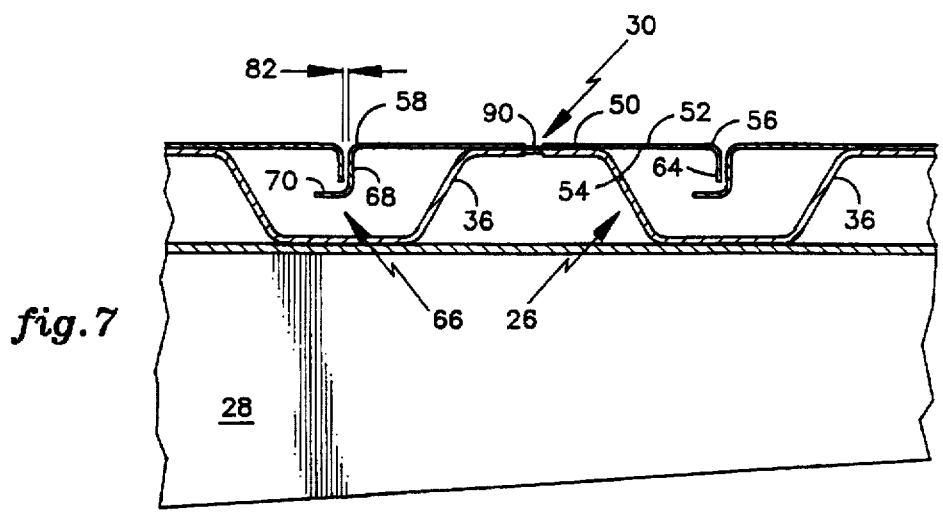
FIG. 7 is a sectional view of the flap seal shown in FIG. 3.
Figure 8:
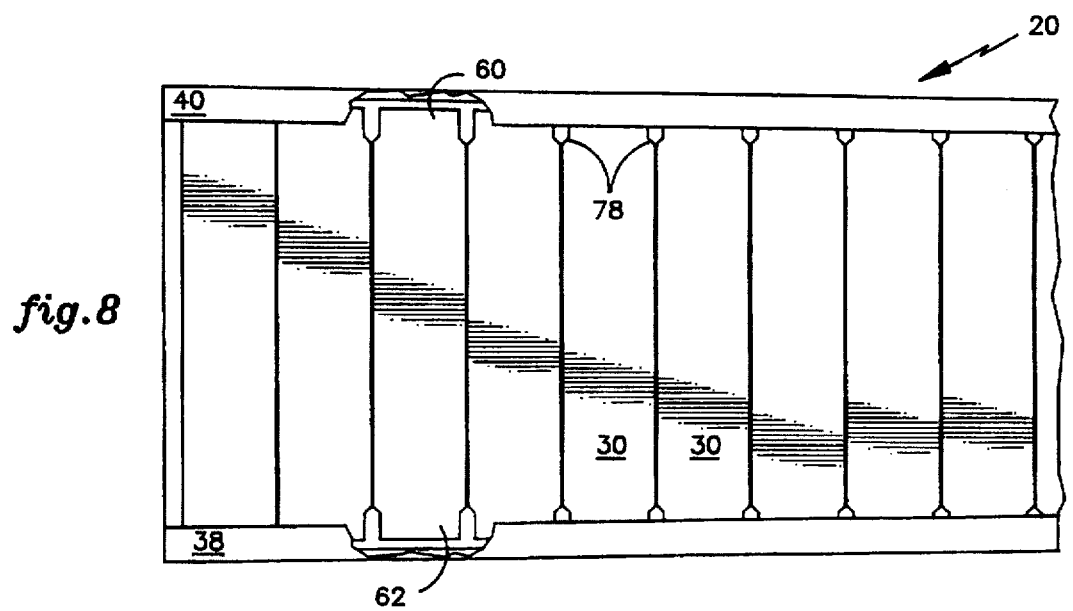
FIG. 8 is a diagrammatic partial view of the hot side of the seal showing a particular face segment embodiment.

Referring to FIG. 7, each face segment 30 includes a midsection 50, having an inner 52 and an outer 54 surface, a first edge 56, a second edge 58, a first end 60, and a second end 62 (see FIG. 8). The edges 56,58 are parallel with each other and substantially perpendicular with the ends 60,62. Each face segment 30 further includes a first flange 64 and a second flange 66. The first flange 64 is attached to the first edge 56 of the midsection 50. The second flange 66 is attached to the second edge 58 of the midsection 50. In the preferred embodiment, the first 64 and second 66 flanges are formed by bending sections of the face segment 30 away from the midsection 50. Hence, the face segments 30 may be formed from a sheet metal blank.

The first 64 and second 66 flanges comprise mating geometries such that when face segments 30 are positioned adjacent each other, the first flange 64 of one face segment 30 couples with the second flange 66 of the adjacent face segment 30. FIG. 7 shows the preferred embodiment of the first 64 and second 66 flanges. The first flange 64 is perpendicular to the midsection 50. The second flange 66 is "L" shaped; i.e., it includes a first section 68 perpendicular to the midsection 50 and a second section 70 parallel to the midsection 50.

Referring to FIG. 3, the end face segment 72 includes only one of the first 64 or second 66 flanges (see FIG. 7) and is extended in the midsection 50. When assembled with the body 26, the end face segment 72 and body 26 cream a pocket 74 (shown in phantom) for receiving a hinge means 76 for pivotly attaching the seal 20. U.S. Pat. No. 5,238,189 (incorporated by reference supra) discloses such a hinge means 76.

Figure 9:
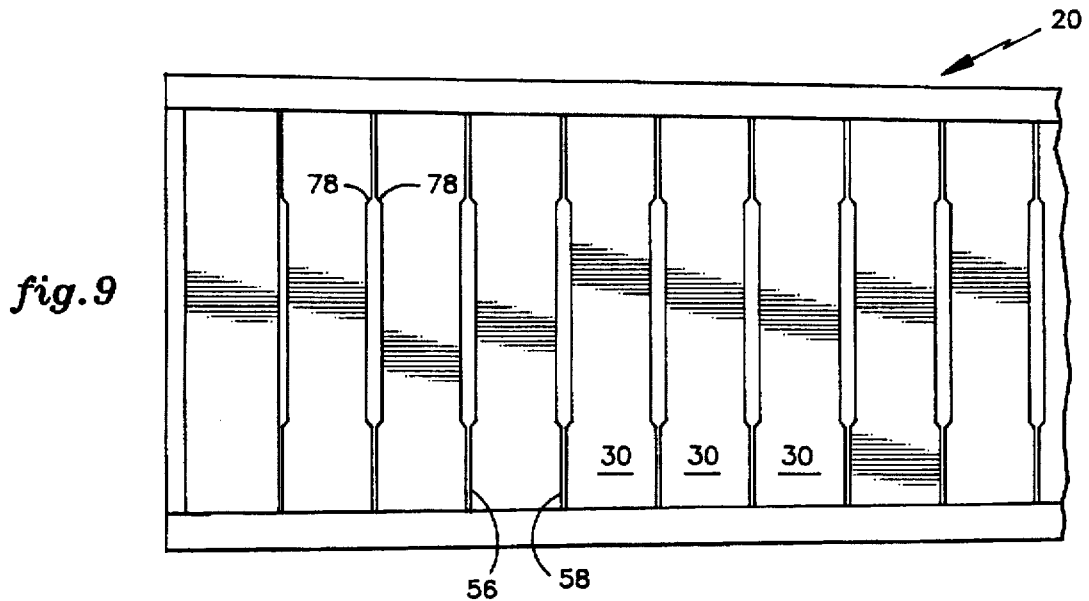
FIG. 9 is a diagrammatic partial view of the hot side of the seal showing another face segment embodiment.

Referring to FIGS. 8 and 9, in one embodiment the face segments 30 further comprise a scallop 78 extending along either the first 56 or second 58 edge, or both. The scallops 78 decrease the distance between the first 56 and second 58 edges in a particular face segment 30 and increase the distance between edges 56,58 of adjacent face segments 30 to permit greater thermal growth in a particular area of the seal 20. The scallops 78, for example, may be placed in the center region of all face segments 30 if the seal 20 is to experience a steep thermal gradient in the center region along the entire length of the seal 20. Alternatively, if the thermal gradient is significantly higher in a particular area of the seal 20, then the face segments 30 in that particular area may include scallops 78 to allow for greater thermal expansion in that particular area; i.e., hot spots at one end of the seal 20 or along the width edges 42,44, etc. FIG. 8 shows scallops 78 near the ends 60,62 of the face segments 30 to allow for thermal expansion near the ends 60,62 and to facilitate translation within the channels 38,40.

Referring to FIG. 4, the spine member 28 is a rigid member attached to the cold-side of the body 26, attached by weld, braze, or other conventional fastener to the corrugations 36 of the body 26. The spine member 28 includes means 80 for attaching the flap seal 20 to the linkage 24 (FIG. 1) which connects the flaps 18 and flap seals 20 together.

Referring to FIG. 7, during assembly the face segments 30 are attached to the corrugations 36 of the body 26 by spot welds 90 (see FIG. 3 also). The face segments 30 are sized and positioned such that the first flange 64 and second flange 66 of adjacent face segments 30 nest together, separated by a predetermined gap 82. The gap 82 is sized to allow the expected thermal expansion of adjacent face segments 30. The mating geometries of the first 64 and second 66 flanges substantially prevent gases passing along the outer surface 54 of the face segments 30 from passing between the face segments 30. The ends 60,62 of the segments 30 are free to translate within the channels 38,40 (FIG. 6). The spacers 48 positioned in the channels 38,40, inboard of the ends 60,62, help to maintain a channel gap 84 sufficient to prevent binding of the face segments 30. The spacers 48 also help position the face segments 30 during assembly.

Although this invention has been shown and described with respect to the detailed embodiments thereof, it will be understood by those skilled in the art that various changes in form and detail thereof may be made without departing from the spirit and scope of the claimed invention.

We claim:

1. A seal for a gas turbine engine exhaust nozzle, comprising:

a body, having a length and a width, and a plurality of corrugations formed in said body extending across said width, and a first and a second channel, each channel having walls extending lengthwise along said body, wherein one of said channels is positioned on one side of said width, and the other said channel is positioned on the other side of said width;

a spine member, attached to one side of said body, extending along the length of said body; and a plurality of face segments, each attached to said body on the side of said body opposite said side to which said spine member is attached, each said face segment having:

a first and a second end, each end having a thickness;

a midsection, having an inner and an outer surface, and a first edge and a second edge, said edges parallel with each other and substantially perpendicular with said ends;

a first flange, attached to said first edge of said midsection;

a second flange, attached to said second edge of said midsection, wherein said first and second flanges comprise mating geometries such that when face segments are positioned adjacent each other, said first flange of one face segment couples with said second flange of the adjacent face segment, said flanges separated by a predetermined gap along their geometries;

wherein said mating geometries of said first and second flanges substantially prevent gases passing along said outer surface of said face segments from passing between said face segments, and allow thermal growth of adjacent face segments;

wherein said ends of said face segments are freely received within said first and second channels such that said ends may translate within said channels.

2. A seal for a gas turbine engine exhaust nozzle according to claim 1, wherein:

said first flange extends out from said inner surface of said midsection in a substantially perpendicular direction; and said second flange comprises an "L" shaped geometry extending out from said inner surface of said midsection.

3. A seal for a gas turbine engine exhaust nozzle according to claim 2, wherein said face segments further comprise a scallop extending along one of said first or second edge, thereby decreasing the distance between said first and second edges in a particular face segment, and increasing the distance between edges of adjacent face segments to permit greater thermal growth in a particular area of said seal.

4. A seal for a gas turbine engine exhaust nozzle according to claim 3, wherein the distance between the first and second edges of said face segments is less at each end than the maximum distance between the first and second edges otherwise within said face segments.

5. A seal for a gas turbine engine exhaust nozzle according to claim 4, further comprising spacers having a thickness equal to or greater than said thickness of said ends of said face segments;

wherein said spacers are received within said channels, inboard of said ends, and fixed in place, thereby spacing said channel walls a distance apart sufficient to prevent said ends of said face segments from binding in said channels.

6. A seal for a gas turbine engine exhaust nozzle according to claim 5, wherein said channels extend continuously along the entire length of said body.

7. A seal for a gas turbine engine exhaust nozzle according to claim 1, further comprising spacers having a thickness equal to or greater than said thickness of said ends of said face segments;

wherein said spacers are received within said channels inboard of said ends, and fixed in place, thereby spacing said channel walls a distance apart sufficient to prevent said ends of said face segments from binding in said channels.

8. A seal for a gas turbine engine exhaust nozzle according to claim 7, wherein said channels extend continuously along the entire length of said backing plate.

* * * * *

UNITED STATES PATENT AND TRADEMARK OFFICE
CERTIFICATE OF CORRECTION

PATENT NO. : 5,667,140
DATED : September 16, 1997
INVENTOR(S) : Steven B. Johnson, Curtis W. Berger, Miguel A. Garrido, William G. Hoop It is certified that error appears in the above-indentified patent and that said Letters Patent is hereby corrected as shown below:

In column 3 at line 67, change "cream" to --create--.

Signed and Sealed this

Twenty-sixth Day of May, 1998

Attest:

BRUCE LEHMAN

*Attesting Officer*      *Commissioner of Patents and Trademarks*